(12) United States Patent
Soudan

(10) Patent No.: US 7,640,716 B2
(45) Date of Patent: Jan. 5, 2010

(54) DEVICE FOR MANUFACTURING FOAM CUSHIONS

(75) Inventor: Freddy Soudan, Deinze (BE)

(73) Assignee: N.V. Soudan Patrimonium & Consulting, Deinze (BE)

( * ) Notice: Subject to any disclaimer, the term of this patent is extended or adjusted under 35 U.S.C. 154(b) by 0 days.

(21) Appl. No.: 11/791,209

(22) PCT Filed: Nov. 22, 2005

(86) PCT No.: PCT/EP2005/056160

§ 371 (c)(1),
(2), (4) Date: Jan. 29, 2008

(87) PCT Pub. No.: WO2006/053913

PCT Pub. Date: May 26, 2006

(65) Prior Publication Data

US 2008/0148687 A1    Jun. 26, 2008

(30) Foreign Application Priority Data

Nov. 22, 2004  (BE) .................................. 2004/0574
Apr. 4, 2005   (EP) .................................. 05075783

(51) Int. Cl.
B65B 43/04 (2006.01)
(52) U.S. Cl. ............................. 53/550; 53/267; 53/459
(58) Field of Classification Search .................. 53/562, 53/267, 550, 548, 450, 453, 459; 141/90, 141/91
See application file for complete search history.

(56) References Cited

U.S. PATENT DOCUMENTS 2,718,105 A * 9/1955 Ferguson et al. .............. 53/548
3,382,642 A * 5/1968 Shaw ........................... 53/434
3,462,007 A * 8/1969 Heider et al. .................. 428/72
3,840,224 A * 10/1974 Zawiski ....................... 271/263
4,219,054 A * 8/1980 Carter et al. ................... 141/10
4,319,952 A * 3/1982 Schjeldahl ................... 156/510
4,674,268 A * 6/1987 Gavronsky et al. ............ 53/468
4,938,007 A * 7/1990 Sperry .......................... 53/449

(Continued)

FOREIGN PATENT DOCUMENTS

WO    WO 00/78522 A1   12/2000

*Primary Examiner*—Paul R Durand
(74) *Attorney, Agent, or Firm*—Jacobson Holman PLLC

(57) ABSTRACT

A device for manufacturing foam cushions in particular for packaging purposes, said device comprising a foil supply station and a foam dispensing station, said foil supply station being provided for supplying to said foam dispensing station a foil material, having a first and a second side wall joining each other at a common first border and positioned so as to delimit an inner space accessible by an opening applied in a second border, said foam dispensing station comprising first retaining means, provided for retaining said second border, said foam dispensing station further comprising a dispensing member, provided for penetrating through said opening and supplying a foaming substance into said inner space, said device further comprising transport means, provided for transporting said foil material through said dispensing station towards a welding station, said foam dispensing station further comprises slot shaping means mounted offset and downwards from said first retaining means in such a manner as to form a slot to be crossed by an upper stroke of said foil material, said dispensing member being oriented with respect to said slot shaping means when applied into said opening, in such a manner, as to output said foaming substance towards an upper surface of said slot shaping means.

18 Claims, 10 Drawing Sheets

U.S. PATENT DOCUMENTS

| | | | |
|---|---|---|---|
| 4,999,975 A * | 3/1991 | Willden et al. | 53/451 |
| 5,335,483 A * | 8/1994 | Gavronsky et al. | 53/451 |
| 5,679,208 A * | 10/1997 | Sperry et al. | 156/515 |
| 5,727,370 A * | 3/1998 | Sperry | 53/472 |
| 5,776,510 A * | 7/1998 | Reichental et al. | 425/112 |
| 5,794,406 A * | 8/1998 | Reichental et al. | 53/410 |
| 6,131,375 A * | 10/2000 | Sperry | 53/472 |
| 6,178,725 B1 * | 1/2001 | Sperry et al. | 53/451 |
| 6,234,777 B1 * | 5/2001 | Sperry et al. | 425/46 |
| 6,625,956 B1 * | 9/2003 | Soudan | 53/455 |
| 6,996,956 B2 * | 2/2006 | Sperry et al. | 53/553 |

* cited by examiner

DEVICE FOR MANUFACTURING FOAM CUSHIONS

This is a 371 of PCT/EP2005/056160 filed 22 Nov. 2005.

The present invention relates to a device for manufacturing foam cushions in particular for packaging purposes, said device comprising a foil supply station and a foam dispensing station, said foil supply station being provided for supplying to said foam dispensing station a foil material, having a first and a second side wall joining each other at a common first border and positioned so as to delimit an inner space accessible by an opening applied in a second border, said foam dispensing station comprising first retaining means, provided for retaining said second border, said foam dispensing station further comprising a dispensing member, provided for penetrating through said opening and supplying a foaming substance into said inner space, said device further comprising transport means, provided for transporting said foil material through said dispensing station towards a welding station, said welding station comprising a welding member, provided for applying a closure weld on said foil material.

Such a device is known from EP-S-1192031. In the known device foil material is supplied to the foam dispensing station where the foaming substance is injected by the dispensing member into the inner space, delimited by the first and second side wall of the foil material. After injection of the foaming substance, the foil material with the foaming substance, present in the inner space thereof, is transported towards the welding station where closure welds are applied on the foil material. In the known device, the foaming substance falls on the first border which is sustained in order to avoid that the first border would be damaged during injection of the foaming substance and during the foaming reaction, pursuant the injection of the foaming substance.

A drawback of the known device is that the means provided for sustaining the foil material renders the device somewhat more complex and thus more expensive to manufacture.

It is an object of the present invention to build a device for manufacturing foam cushions, which is less complex to realise without however affecting the quality of the manufactured foam cushions.

For this purpose, a device according to the present invention is characterised in that said foam dispensing station further comprises slot shaping means mounted offset and downwards from said first retaining means, in such a manner as to form a slot to be crossed by an upper stroke of said foil material, said dispensing member being oriented with respect to said slot shaping means, when applied into said opening, in such a manner as to output said foaming substance towards an upper surface of said slot shaping means. The presence of the slot shaping means forces the foil material to cross the thus formed slot. The orientation of the foam dispensing member causes the ejected foaming substance to be output towards an upper surface of the slot shaping means. The narrow space of the slot causes the first and second side walls to be close to each other. Consequently, the foaming substance is somewhat hindered in its natural fall down movement. The fact that the foaming substance is output towards an upper surface of the slot shaping means causes the foaming substance to be spread open by the slot shaping means and fall down slowly like a curtain in an equally spaced manner. This spreading no longer imposes to sustain the first border since the thus obtained lower speed reduces the impact force. Moreover, as the foaming substance is spread, the foaming reaction takes place over a larger surface, thereby causing a better spreading out of the foams over the whole cushion surface.

A first preferred embodiment of a device according to the invention is characterised in that said dispensing member is obliquely oriented with respect to said slot shaping means, when applied into said opening. The oblique orientation of the foam dispensing member contributes to the spreading out of the foam material.

A second preferred embodiment of a device according to the invention is characterised in that said transport means comprises a guiding and clamping unit, provided for guiding and clamping said second border after having crossed said slot shaping means. In such a manner, the foil material is supported when the foaming reaction occurs.

Preferably said slot shaping means comprises at least two rotationally driven brushes. The brushes not only enable to shape the slot but also, due to their rotational movement, to contribute to the transport of the foil material and the spread open of the foaming substance.

A third preferred embodiment of a device according to the invention is characterised in that said welding member comprises a welding head mounted on an arm, which can be displaced from and towards said second border, said arm being connected with a control unit provided for generating a series of pulses during said welding, said arm being provided for displacing said welding head from and towards said second border under control of said series of pulses. By moving the welding head during the welding operation, the latter is displaced towards and from the border to be welded, thereby enabling the foil material to temporarily cool down and reducing the risk that the foil material melts too much.

Preferably said arm is adjusted in such a manner as to leave a gap between an extremity of said welding head and said second border during said welding. The presence of the gap prevents direct contact between the welding head and the foil material and reduces even more the danger that the foil material would melt.

A fourth preferred embodiment of a device according to the invention is characterised in that said foam dispensing station comprises second retaining means provided to operate synchronously with said transport means, said retaining means being further provided for retaining said foil material when said pulling arm applies a pulling force on said foil material. By retaining the foil material when a pulling force is applied thereon, a tearing off of the foil material is avoided.

A fifth preferred embodiment of a device according to the invention is characterised in that said dispensing member is provided to be displaced between a first position, situated within said inner space and a second position, situated at a head cleaning station. In such a manner the foam dispensing member can be cleaned.

A sixth preferred embodiment of a device according to the invention is characterised in that said head cleaning station comprises a reservoir provided for storing a cleaning fluid, said reservoir being provided with a cover head, having a displaceable opening lid. The cleaning fluid is thus in a closed reservoir, avoiding in that way that evaporation gases continuously mix with ambient air.

Preferably said first and second side wall of said foil material form a closed loop, said device being provided with a cutting member mounted upstream of said foam dispensing station and provided for applying said opening at said second border. As the foil material is generally furnished as a closed loop, this enables to use such foil material.

Preferably said foil material is provided with a series of bars applied each time at an equal distance from each other, said device comprises bar reading means provided for reading said bars of said series and determining a speed signal, indicating a speed at which said foil material travels through said device. The presence of such bars enables an easy speed control of the foil material when crossing the device.

The invention will now be descried in more details with reference to the annexed drawings illustrating a preferred embodiment of a device according to the present invention.

In the drawings:

FIG. 1 shows a top view of a device according to the invention;

FIGS. 2a+b show a detailed view of the foil supply station as part of the device according to the invention;

Figure 1:
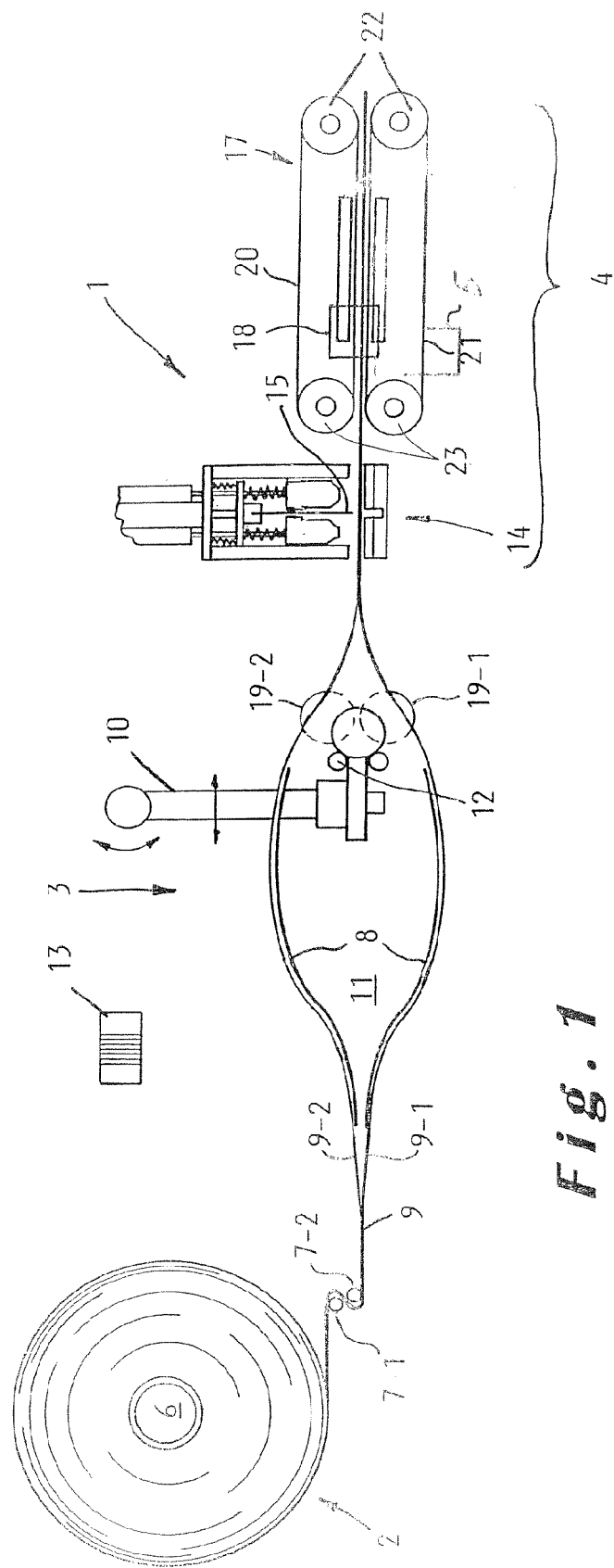

In the drawings a same reference sign has been attributed to a same or analogous element.

The device 1 for manufacturing foam cushions, in particular for packaging purposes, according to the invention and illustrated in FIG. 1, comprises a foil supply station 2, mounted upstream of a foam dispensing station 3. Downstream of the foam dispensing station a welding station 4 is mounted. The latter comprises a vertical welding and cutting unit 14, followed by a horizontal welding member 5. The different stations are preferably mounted on a frame. However, the foil supply could be formed by a free standing station, which is not mounted on a common frame. A common frame has however the advantage to provide a certain rigidity to the complete device.

Figure 2A:
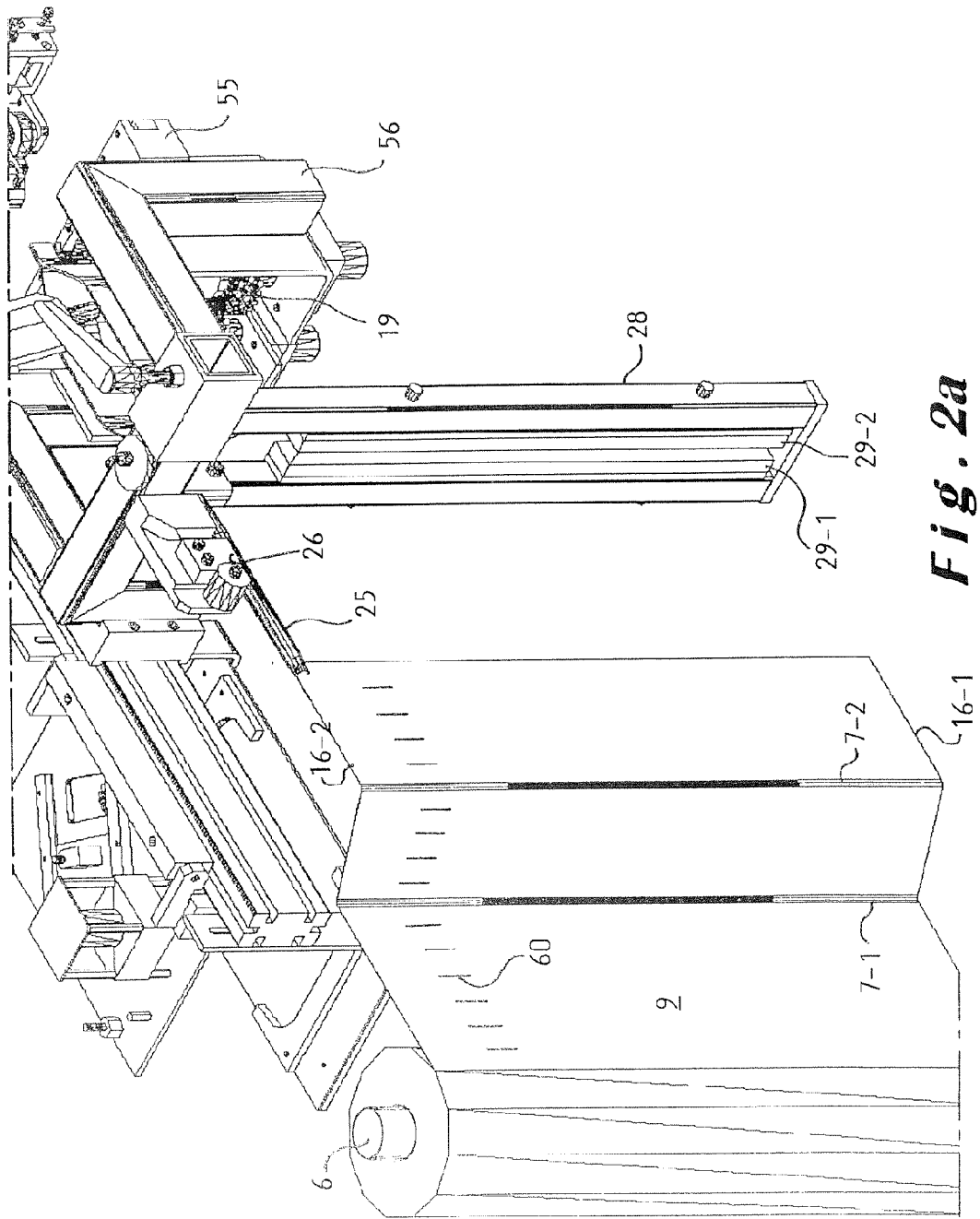
Figure 2B:
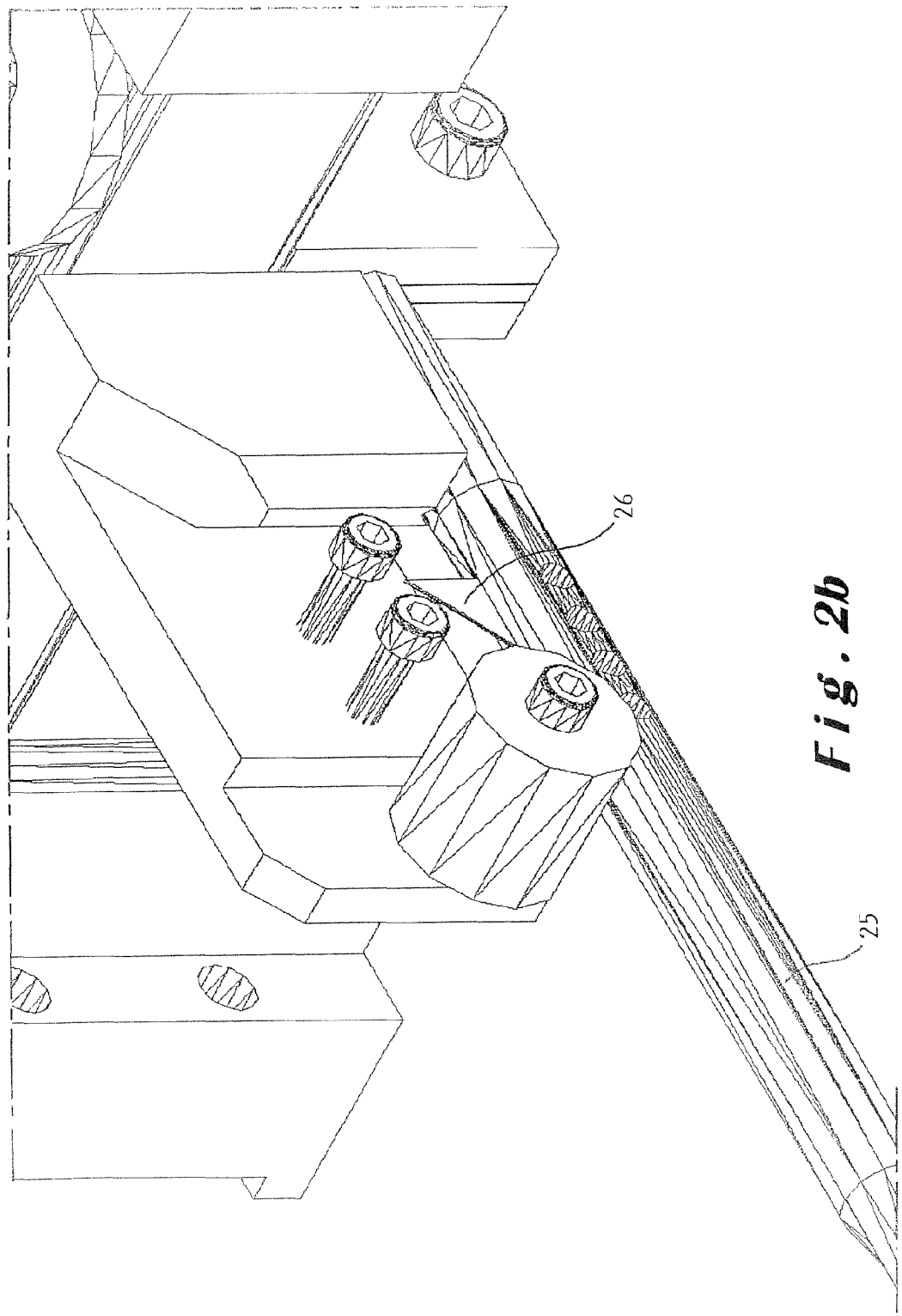

The foil supply station 2 comprises a spindle 6 around which foil material 9 is winded The foil material has a first 9-1 and a second 9-2 wall joining each other at a common first border 16-1 and positioned so as to delimit an inner space accessible by an opening applied in a second border 16-2 (FIG. 2). The second border is situated opposite to the first border. Preferably said first and second side wall of the foil material form a closed loop, which is for example obtained by extruding polyethylene. The advantage of using foil material forming a closed loop is that the guiding of the foil material towards the foam dispensing station can be realised more accurately. For this purpose, the foil supply station comprises a guiding member 25, followed by a cutting member 26 mounted upstream of the foam dispensing station. The guiding member is preferably shaped as a pen and mounted in such a manner as to penetrate inside the closed loop, formed by the foil material. The guiding member 25 enters at the level of the second border 16-2, supporting and guiding in such a manner the supplied foil material on its upper side where the second border is situated. The guiding member extends preferably over a length of 6 to 15 cm such as to give sufficient support and open the closed loop. The opening in the second border is formed by the cutting member 26, formed for example by a small knife, as illustrated in FIG. 2b.

As is also illustrated in FIG. 2a, the foil supply station further comprises chicane shaping means 7-1 and 7-2 provided to impose a chicane path on the foil material. The chicane shaping means are placed between the spindle 6 and the guiding member 25 and are for example formed by two axes placed parallel to each other and along which the foil material is guided, in such a manner as to follow a chicane path instead of a linear path towards the foam dispensing member. The purpose of the chicane shaping means will be described hereinafter.

The foil material 9 is preferably provided with a series of bars 60 applied each time at an equal distance from each other. The bars are for example printed in black colour so as to be easily recognisable. The series of bars are for example applied on the outer side of the first side wall 9-1 and are used for speed control purpose, as will be described hereinafter.

Approximately at the transition between the foil material supply station and the foam dispensing station, there are mounted second retaining means 28 comprising two clamping bars 29-1 and 29-2 which are movable from and towards said foil material passing between the bars. The latter are for example pneumatically or hydraulically driven.

The foil supply station is provided for supplying the foil material to the foam dispensing station by unrolling the winded foil and transporting the latter via chicane shaping means 7-1 and 7-2 and the second retaining means 28 to first retaining means 8 of the foam dispensing station. Due to the fact that the foil material is winded on the spindle 6 it is rather easy to change the foil roll. Furthermore, different dimensions of the foil are possible because it is not necessary that the spindle around which the foil is winded extends over the whole height of the spindle axis.

Figure 3:
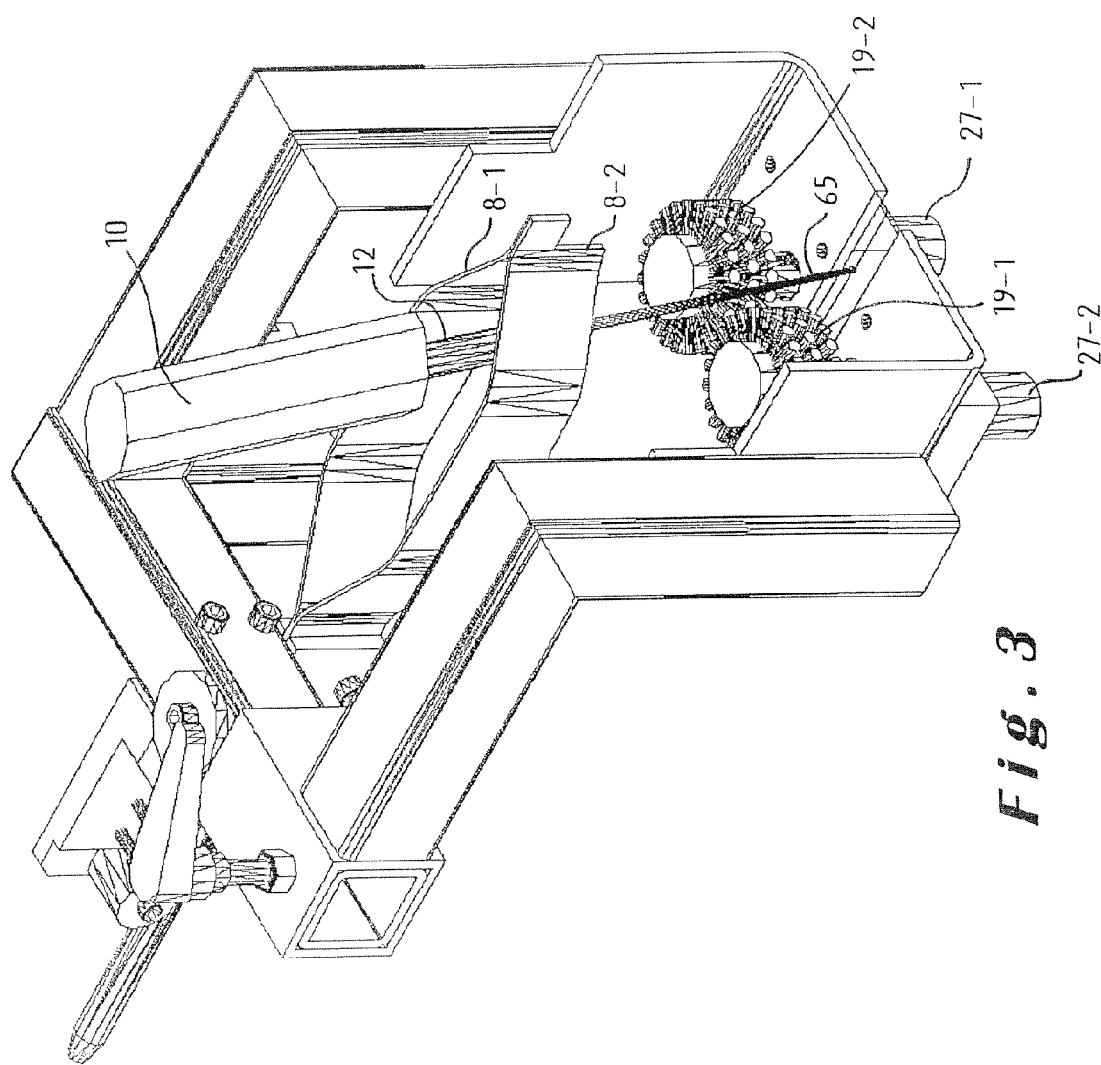
FIG. 3 shows a detailed view of the foam dispensing station as part of the device according to the invention.

The second border 16-2 of the foil material, after having been cut open, if necessary, by the cutting member 26, is kept open by the first retaining means 8 (FIGS. 2 and 3). The latter are formed by a pair of clamps 8-1 and 8-2 applied face to face such as to form a substantially oval shaped opening. The opening thus formed in the foil material, enables a foam dispensing member 12 to enter into the volume delimited by the first and second wall 9-1, 9-2 of the foil material. The foam dispensing member 12 is formed by a mixing gun enabling a mixture of the foaming agents before the foaming substance leaves the mixing gun. The foam dispensing member is mounted on a movable arm, provided to move the foam dispensing member not only in and out of the volume delimited by the foil material, but also along a path connecting a first position formed by the opening in the foil material and a second position situated at a head cleaning station 13.

As illustrated in FIG. 3, the foam dispensing member 12 and the arm 10, when situated in their first position, are obliquely oriented with respect to the plane where the second border is situated.

The foam dispensing station further comprises slot shaping means 19-1 and 19-2 mounted offset and downwards from the first retaining means. As illustrated in FIG. 3, the slot shaping means preferably comprise at least two rotationally driven brushes and rotate in opposite direction from each other. The brushes are mounted on an axis driven by an electrical or pneumatic motor 27-1 and 27-2. The brushes are mounted in such a manner that they form a slot to be crossed by an upper stroke of the foil material 9. The slot shaping means are located underneath the output of the first retaining means 8 at a distance of 10 to 20 cm underneath the upper border of the first retaining means. The brushes are preferably made of a hard material in order to sufficiently grip on the foil material crossing the slot provided by the slot shaping means.

The inclination of the foam dispensing member, when in the first position, is such, that the foam dispensing member is oriented with respect to the slot shaping means in such a manner as to output the foaming substance towards an upper surface of the slot shaping means 19. The foam dispensing member is therefor put in the opening at the second border formed by the first retaining means 8 in such a manner that the output of the foam dispensing member faces the upper surface of the brushes forming the slot shaping means. By spraying the foaming substance towards an upper surface of the slot shaping means, the foaming substance can not directly fall towards the first border of the foil material as the latter is squeezed in the slot shaping means. Indeed, an upper part of the foil material i.e. at the second border 16-2 is kept open by the first retaining means 8 so that the foam dispensing member 12 can enter into the inner volume of the foil material. As the foaming substance falls on the upper surface of the slot shaping means, the rotation of the brushes helps to spread open the foaming substance. The foam dispensing member only enters over a short distance into this inner volume, as illustrated in FIG. 3. The distance at which the foam dispensing member enters this inner volume is less than the distance between the upper plane of the first retaining means 8 and the slot shaping means 19.

Due to the configuration of the first retaining means 8 and the slot shaping means 19, the foil material forms as if to say a funnel extending between the first retaining means and the slot shaping means. This funnel enables to enter the foam dispensing member therein. Due to the orientation of the foam dispensing member, when inside the funnel, the foaming substance 28 reaches the exit of the narrow slot, formed by the slot shaping means. This narrow slot considerably limits the falling down, due to gravity, of the foaming substance, thereby causing a lengthwise spreading out of the injected foaming substance. In such a manner, the foaming substance is equally spread out over the transversal length of the foil material. The foaming substance will then react while slowly falling down in the inner volume of the foil material. A substantially equal filling of this inner volume is thus obtained.

The foaming substance is preferably formed by a two component substance, which is mixed in the spray gun. However, it is also possible to use a granulate on a starch basis. In the latter case, the dispensing member comprises a supply duct for granulates and another duct for supplying a liquid, preferably water, which is atomised or sprayed over the supplied granulates. In such a manner, the supplied granulates are sucked in the sprayed or atomised liquid which stimulates their dispersion. The foil material is preferably made of a cellulose film in order to become an environmental friendly and degradable foam cushion. Polycaprolacton could also be used for the foil material.

The welding and cutting station 4 comprise a vertical welding member 14, having two welding heads. Between the welding heads there is provided a cutting tool formed either by a heated wire or a cutting knife. The welding member 14 extends vertically and serves to weld the lateral sides of the foam bag to be formed.

For this purpose, the first and second wall of the foil material are welded together in order to form a closed bag. The cutting tool applies a cut between both welds in order to separate the successive bags from each other. The welding members and the cutting tool can be controlled individually in order to enable the realisation of a chain of foam bags, simply by non cutting a set of successive bags.

Figure 4:
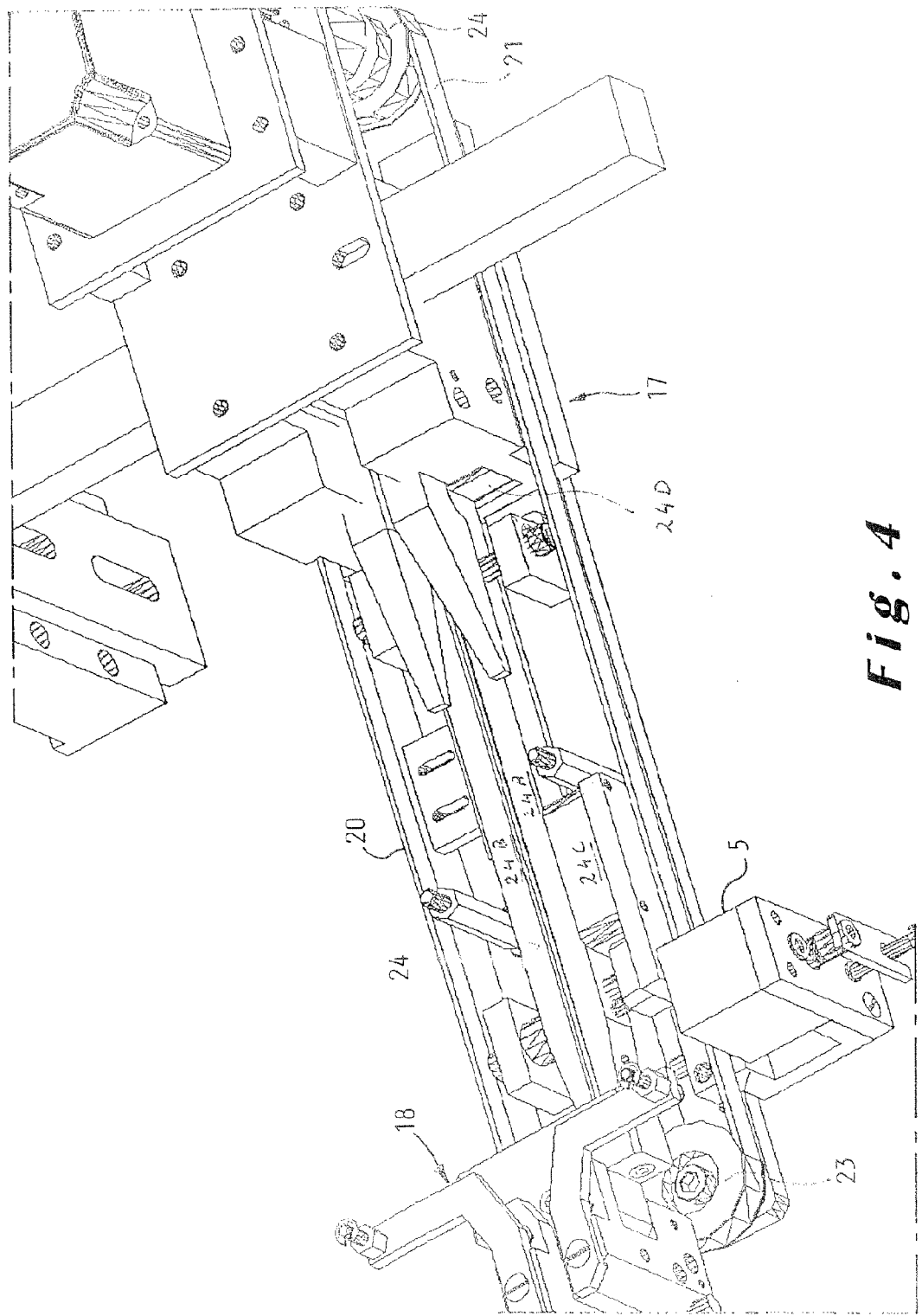
FIG. 4 shows a detailed view of the transport means and the welding station.

Downstream of the vertical welding member 14, transport means 17 are applied as well as a pulling arm 18, as illustrated in FIGS. 1 and 4. The transport means preferably comprises two toothed belts 20 and 21, which are mounted on wheels 22 and 23. Furthermore, a clamping unit 24, comprising two parallel clamping beams 24A and 24B, is mounted in the inner space delimited by the toothed belts. Preferably clamping beam 24B is fixed, while clamping beam 24A is movable mounted on cylinders 24C and 24D, which cylinders are pneumatically driven. The cylinders enable to displace the clamping beam 24A towards and from the fixed clamping beam 24B. In such a manner the clamping beams, when brought towards each other, retain the foil material near its second border when present inside the welding station, while the toothed belts move the foil material through the welding station. Instead of using pneumatic energy for moving the clamping beams, it is also possible to use hydraulic energy.

Figure 5:
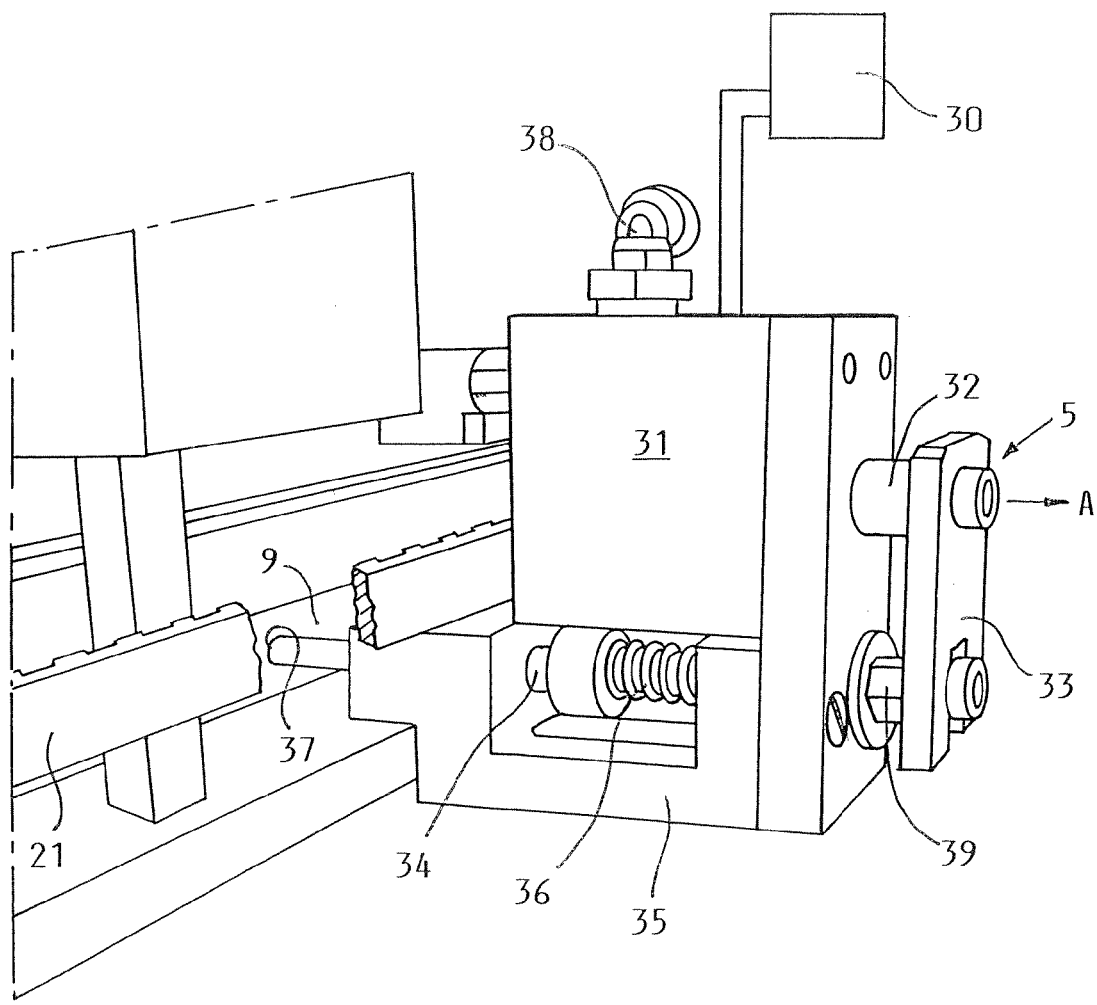
FIG. 5 illustrates more details of the welding member.

FIG. 5 shows a detailed view of the horizontal welding member 5. The welding member 5 is mounted aside of the toothed belt 21 and connected with a control unit 30, for example formed by a microprocessor provided with a memory. The welding member 5 preferably comprises a pneumatic cylinder 31 controlling a rod 32. On this rod 32 a connection plate 33 is mounted which acts on an extremity of an arm 34. The latter is mounted in a bracket 35. Around the arm 34 a spring 36 is wrapped. On the other end of the arm 34 a welding head 37 is mounted. The welding head 37 points towards the second border of the foil material 9. The pneumatic cylinder receives compressed air via a duct 38.

The control unit 30 is provided for generating a series of control pulses during the welding operation and for supplying the latter to the pneumatic cylinder 31. The time period of each control pulse can be variable and is determined by the type of weld to be applied on the second border of the foil material. Each time when the pneumatic cylinder receives a control pulse, compressed air is supplied to the cylinder during the time period of the control pulse. Consequently the rod 32 will move in the direction of arrow A, thereby causing the plate 33 to loose contact with the extremity of the arm 34. This causes on its turn that the plate 33 no longer exerts a pressure on the arm 34, which causes the spring 36, which was compressed, to move the arm 34 also in the direction of the arrow A. The welding head, which is mounted on the other extremity of the arm, is thereby removed from the foil material, thus causing the welding process to stop. In the meantime the foil material continues to be moved by means of the toothed belts, through the welding station. As the welding head is not in contact with the moving foil material, no horizontal welding is applied.

As soon as the time period of the control pulse is over, the supply of compressed air stops causing the rod 32 to be pushed inside the cylinder (opposite direction of arrow A). Plate 36 is now again pushed against the arm 34, which causes the spring 33 to be compressed and the welding head to be moved towards the foil material and thus the welding process to start again.

By moving the welding head back and forward from the foil material the welding process is interrupted and restarted. This enables to apply a succession of welds and openings on the second border of the foil material. The openings are necessary to let escape the heat and the gas formed during the foaming process. Because the control unit determines the series of control pulses, a large possibility is offered to select the types of welds to be applied on the second border of the foil material. So it is possible to weld as if to say a dotted line of welds or to apply longer welds followed by shorter openings.

The arm 34 is preferably provided with an adjustment mechanism 39, for example formed by a bolt or a nut, in order to accurately adjust the distance between the foil material and the welding head. This arm is preferably adjusted in such a manner that between the extremity of the welding head and the foil material a gap is left so that the welding head does not physically contact the foil material. Preferably this gap is smaller than 0.5 mm. The welding is thus realised by heat radiation from the welding head towards the foil material. The advantage thereof is that the welding can be more accurately applied and that the probability that the foil material melts away completely due to the welding heat at the location where the weld is applied is substantially reduced. Moreover, the back and forward movement of the welding head gives the foil material some time to cool down at the location where the weld is applied, thus substantially reducing the probability that the foil material melts away.

In the present embodiment the welding head 5 was only described for the application of the horizontal weld. It will however be clear that the vertical weld can also be applied by leaving openings between successive welds and thus by pulswise controlling the welding member 14.

The operation of the welding members 5 and 14 and the operation of the clamping beams 24A and 24B are synchronised with each other. When the welding member 5 applies horizontal welds, the cylinders 24C and 24D apply a pressure on clamping beam 24A, thereby keeping the clamping beams 24A and 24B in their closed position towards each other. The pressure is then also applied on the belts 20 and 21 and on the foil material present between the belts and the beams. So during the application of the horizontal weld the foil material is retained by the clamping beams and displaced by the belts. The pressure is also applied when the vertical weld is applied by means of the welding member 14. After application of the vertical weld, the foil material is displaced away from welding member 14 by means of the belts 20 and 21 and this until the welded vertical border reaches the place where the welding member 5 is located. As this is only a short distance, since the welding member 5 is on the front side of the welding station, this displacement only takes a short time. Thereafter the pressure applied on clamping beam 24A is removed, causing beam 24A to move away from beam 24B and to release the pressure applied on the foil material. As the foil material, with the foam forming the cushion, is thus no longer retained by the clamping beams, the cushion falls down by gravity. Preferably a cavity is provided to receive the cushion.

Figure 6:
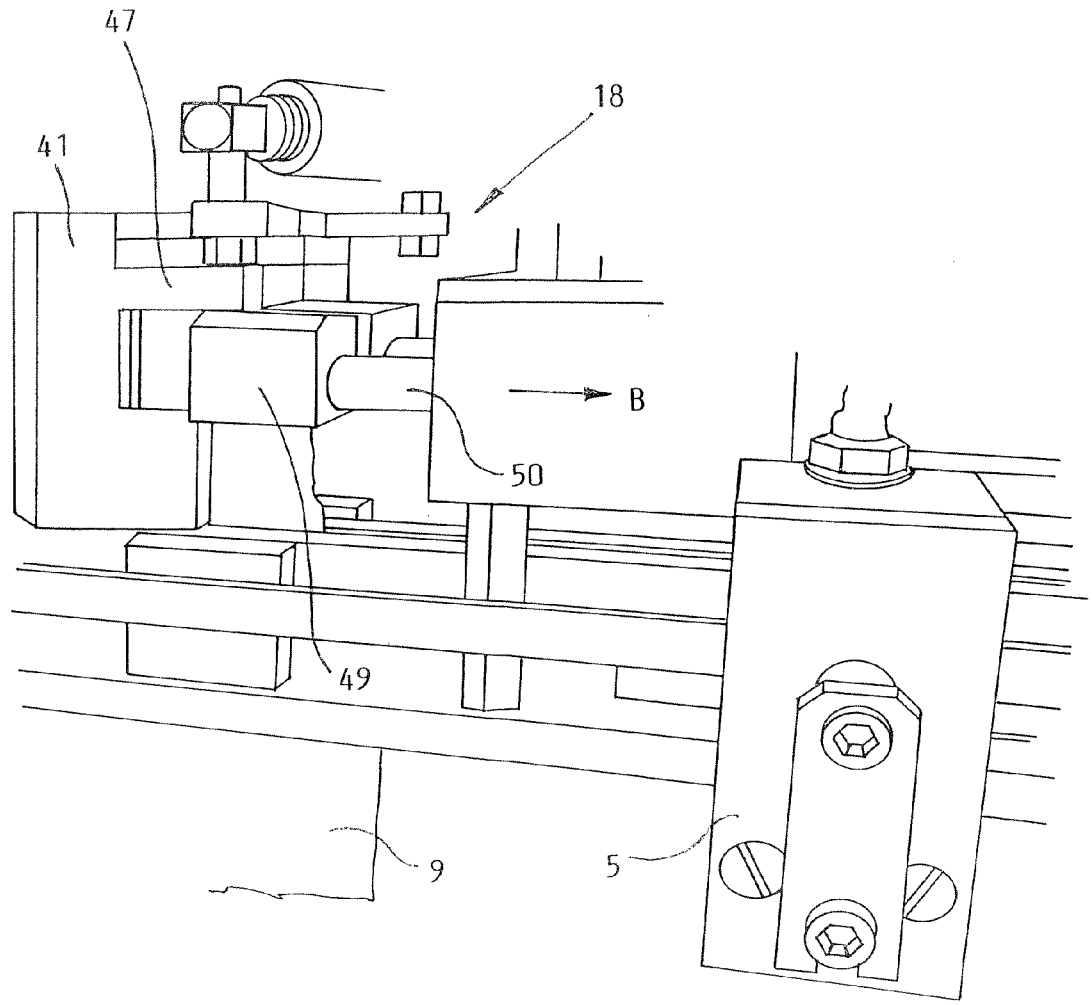
FIGS. 6, 7 and 8 illustrate a detailed view of the clamping arm.
Figure 7:
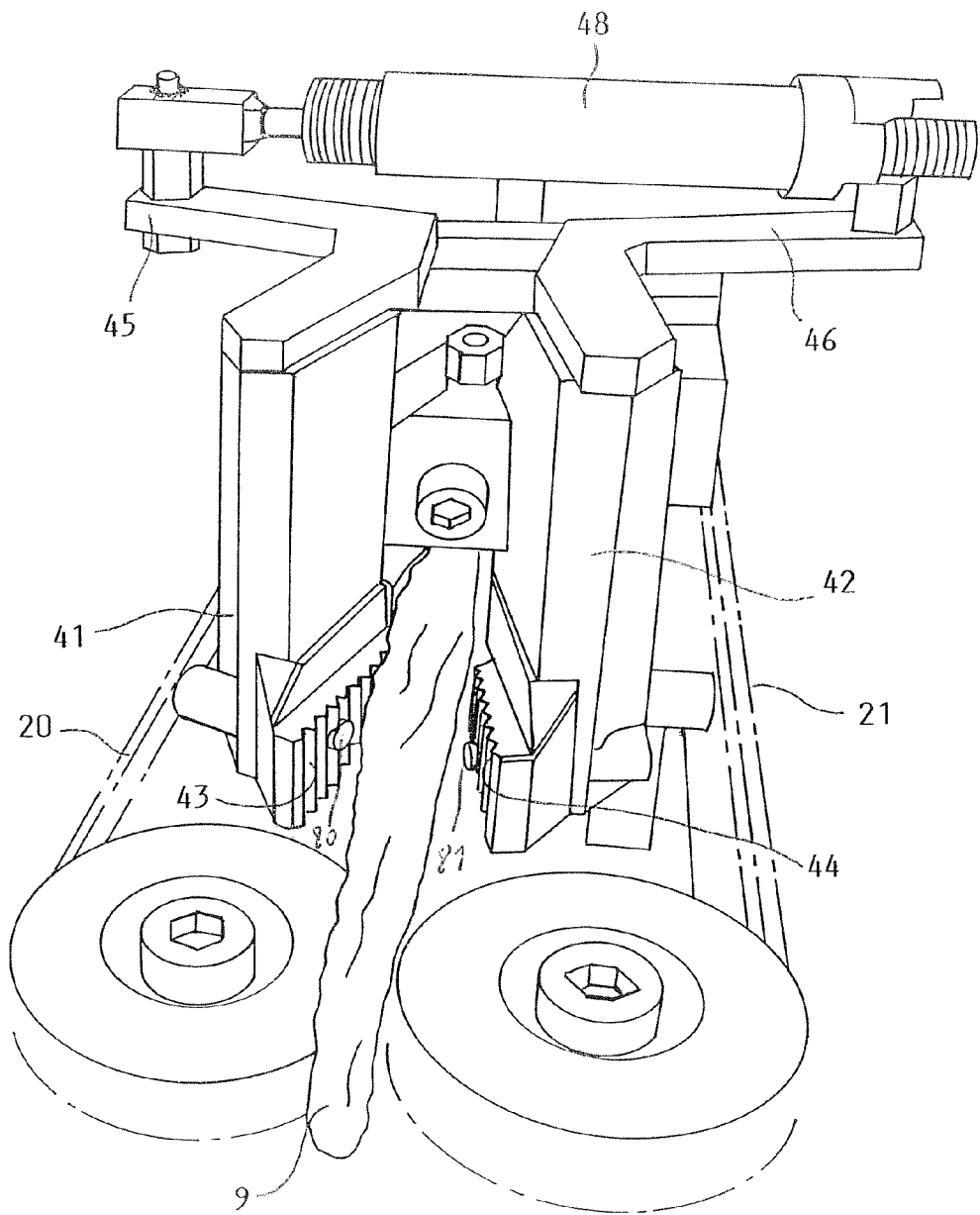
Figure 8:
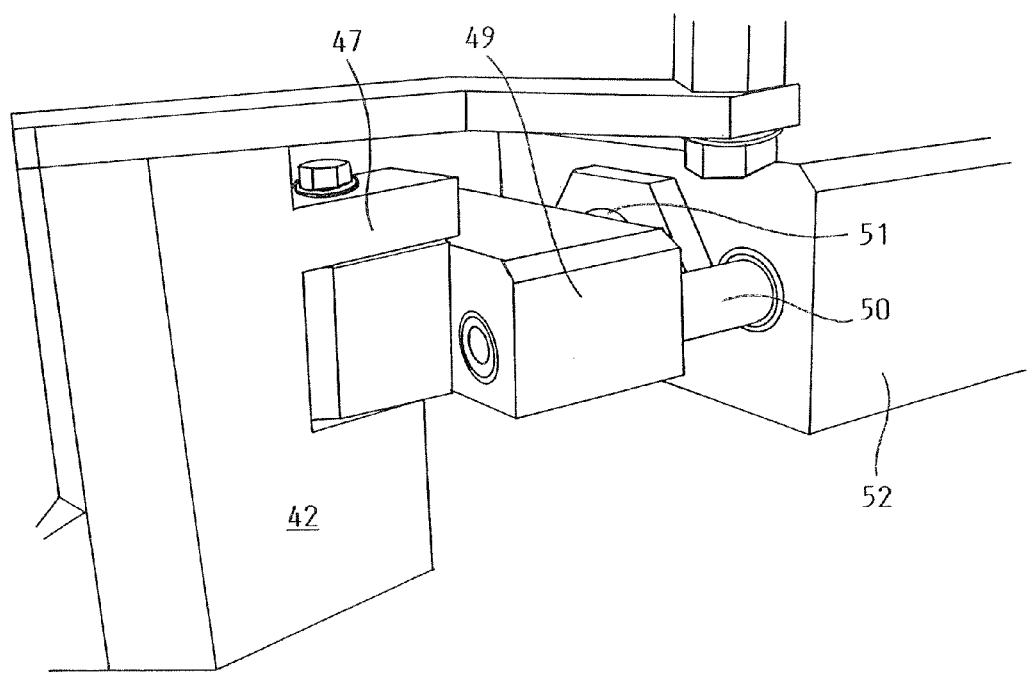

The FIGS. 6, 7 and 8 show a detailed view of the pulling arm 18, which is part of transport means for transporting the film through the device. The pulling arm 18 comprises two jaws 41 and 42, which are each provided with a toothed profile 43 and 44. The jaws are each mounted on a bracket 45, 46 connected with an axis 47 on which a control member 48, for example formed by a pneumatic cylinder, is mounted. The jaws are connected with a mounting block 49, which is mounted on axis 50 and driven by a further control member 51, which is for example also formed by a pneumatic cylinder. The pulling arm is applied above the toothed belts 20 and 21.

In the toothed profile of the jaws 41 and 42 a detector 80, 81 is mounted. The detector is for example formed by electrical contact plates, which are part of an electric circuit. When no foil material would be present between the jaws and if the jaws would be moved towards each other, those contact plates would contact each other, thereby closing the electrical circuit. This could on its turn generate an alarm signal stopping the device. In the presence of foil material, the latter works as an insulator between the contact plates.

The further control member 51 takes care of the displacement in horizontal direction of the pulling arm. For this purpose the further control member pushes and pulls alternately on the mounting block 49 and the axes 50 slides through the block 52. This movement takes care of the displacement of the pulling arm towards the front side of the foil material 9. The jaws 41 and 42 are thereby brought towards the foil material which is present at the extremity of the foam dispensing station. Because the axis 50 slide in the block, an adequate guiding of the puling arm is obtained. Once the foil material has been grasped by the jaws, the displacement of the pulling arm brings the foil material towards the toothed belts 20 and 21.

During the movement in horizontal direction towards the foil material present in the foam dispensing station, the jaws 41 and 42 are open as showed in FIG. 7. This movement is for example controlled by the control unit which controls the supply of pressurised air to the further control member 51. Once the jaws arrive at the level of the output of the foam dispensing station and are thus opposite the foil material, the horizontal movement is stopped. The control unit now controls the control member 48 by supplying pressurised air to the pneumatic cylinder. The latter will now exert a force on the brackets 45 and 46. This causes them to be pushed away from each other. Because the brackets are connected with their respective jaws, which on their turn are mounted on the axes 47, the movement of the brackets will cause a rotation of the jaws around the axes 47, thereby causing the jaws to be moved towards each other. The toothed profiles 43 and 44, which are mounted on the jaws will thus be brought towards the foil material and the closing of the jaws will cause the clamping of the foil material by the toothed profiles. After the jaws have grasped the foil material, the control of the control unit 48 is stopped and the latter is maintained in its closed position in order to keep the jaws closed. The further control member 51 is thereafter again activated in order to move the mounting block 49 in the direction indicated by arrow B and thus to transport the foil material 9 from the foam dispensing station towards the toothed belts 20 and 21 so that the welding can take place at the welding station. After that the mounting block is brought back to its initial position, the control member 48 is again activated in order to release the pressure applied on the jaws and open the latter. The foil material is now retained by the clamping beams of the clamping unit 24 which have been moved towards the foil material once the pulling arm has pulled the foil material in the welding station. During the transport through the welding station, the foil material is welded by the welding member 5 along which the foil material is transported.

The device according to the invention further comprises a displacement detector 55 (see FIG. 2) mounted for example on the same support 56 on which the slot shaping means 19 are mounted. The displacement detector is oriented towards the foil material 9 in such a manner as to read the series of bars 60 applied on the foil material. The displacement detector for example comprises a LED or a photocell provided for emitting light towards the foil material and catch the light reflected back by the foil material. So, each time a bar of the series of bars 60 passes along the displacement detector, the reflected light pattern is changed, which is detected by the displacement detector. The succession at which the reflected light pattern changes is an indication of the speed at which the foil material is transported through the device. The reflected light pattern signal is converted by the displacement detector into a control signal supplied to the control units 30 and 48. The latter used this control signal to control the welding members and the clamping member and the pulling arm. The speed at which the foil material is moved through the foam dispensing station can vary, which enables to modify the filling degree of the inner volume and thus the dimension of the formed foam cushion.

The pulling arm 18 co-operates with the second retaining means 28, which are synchronised with the pulling arm. Besides moving the foil material from the foam dispensing station through the welding station, the pulling arm 18 also serves to tear off a foam bag from the remaining foil material, once the horizontal and vertical welds are applied on the foil material. Indeed, after having applied the horizontal welds by means of the welding member 5, the vertical welds are applied by the welding member 14. It could also be possible to apply the horizontal and vertical weld simultaneously. For this purpose however the welding member 5 should be moved along the second border instead of moving the second border along the welding member.

Once the welds are applied and the cutting member of unit 14 has made a vertical cut in the foil material, the foam bag can be pulled away from the rest of the foil material. For this purpose, the pulling arm again grasps the second border of the foil material while the clamping beams 24A and 24B are synchronously moved towards the foil material. After the pulling arm has grasped the foil material and the latter is clamped between the beams 29, the pulling arm applies a pull on the foil material thereby pulling off the formed foam bag. The fact that the foil material is clamped between the clamping beams of the second retaining means 28, avoids that the pulling is exerted on the supplied foil material, thereby taking care that the supplied foil material is not damaged.

The chicane shaping means 7 also contributes to avoid that the pulling force is applied over the supplied foil material. For this purpose, axis 7-1 is rotably driven, for example by a pneumatic or hydraulic motor. Axis 7-1 is driven when the vertical weld is applied. When axis 7-1 is driven, the foil material is clamped by the retaining means 28 in order to avoid that the movement of the axis would cause a pulling on the foil material and pull the latter out of the welding station. During the application of the horizontal weld the axis 7-1 is driven in order to supply foil material. After that the pulling arm 18 has grasped the foil material, the belts 20 and 21 will transport the foil material while in the meantime the axis 7-1 is driven for supplying the foil material. The axis 7-1 is driven in such a manner that the foil material is somewhat loose in order to provide sufficient foil material and avoid tearing thereon.

Figure 9:
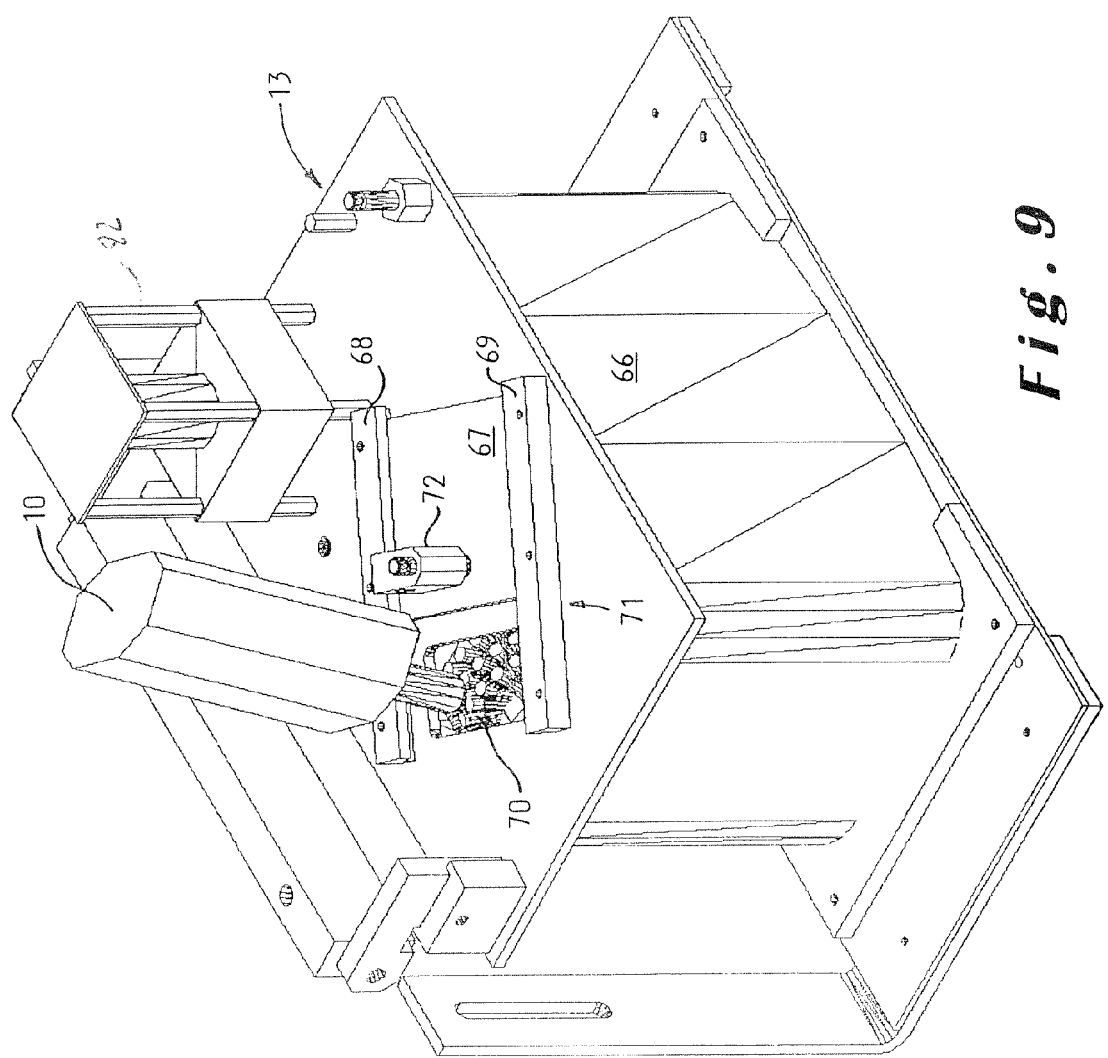
FIG. 9 illustrates the cleaning head station.

As illustrated in FIG. 9, the device further comprises a head cleaning station 13 provided for cleaning the head 12 of the foam dispensing member. The head cleaning station comprises a reservoir 66 in which a cleaning fluid is stored. The reservoir is preferably formed by a removable cartridge, which enables an easy and environment friendly replacement, once the cleaning fluid is too polluted with foaming substance. The reservoir provided with a cover head 71 having a displaceable opening lid 67. The lid 67 is slidably mounted between two guides 68 and 69 and activated by a motor 72. Inside the reservoir there is a brush 70. The reservoir is further provided with a detector for indicating the filling degree.

As already mentioned, the arm 10 on which the foam dispensing member is mounted is displaceable between the first position inside the foil material inner space and a second position situated at the head cleaning station. This displacement comprises a rotation which is only possible when the foam dispensing member is no longer inside the inner space of the foil material in order not to damage it. Once the foaming substance has been sprayed, the foam dispensing member is lifted out of this inner space and rotated towards the head cleaning station. When the foam dispensing member reaches the cleaning station, the motor 72 is activated in order to have the opening lid 67 sliding along the guides 68 and 69 and open the reservoir 66. The head of the foam dispensing member is then entered into the reservoir and moved against brushes 70 in order to be cleaned. As the brushes are in a solvent fluid, the remaining foaming substance is removed from the head of the foam dispensing member. In such a manner an obstruction of the foam dispensing member is avoided. Preferably the brushes are driven by a motor 82. After cleaning, the foam dispensing member is brought back to its first position and the opening lid 67 is again displaced in order to close the reservoir. In such a manner, the reservoir is only opened when the dispensing member is cleaned, thereby avoiding that the cleaning fluid would continuously evaporate and pollute the atmosphere.

The invention claimed is:

1. A device for manufacturing foam cushions in particular for packaging purposes, the device comprising a foil supply station and a foam dispensing station, the foil supply station being provided for supplying to the foam dispensing station a foil material, having a first and a second side wall joining each other at a common first border and positioned so as to delimit an inner space accessible by an opening applied in a second border, the foam dispensing station comprising first retaining means, provided for retaining the second border and keeping the opening when retaining the second border, the foam dispensing station further comprising a dispensing member, provided for penetrating through the opening and supplying a foaming substance into the inner space, the device further comprising transport means, provided for transporting the foil material through the dispensing station towards a welding station, the welding station comprising a welding member provided for applying a closure weld on the foil material, characterized in that the foam dispensing station further comprises slot shaping means comprising at least two rotationally driven brushes mounted offset and underneath the opening in such a manner as to form a slot to be crossed by an upper stroke of the foil material, the dispensing member being oriented with respect to the brushes when applied into the opening, in such a manner, as to output the foaming substance towards an upper surface of the brushes before entering the slot.

2. The device as claimed in claim 1, characterized in that the dispensing member is obliquely oriented with respect to the slot shaping means when applied into the opening.

3. The device as claimed in claim 1, characterized in that the transport means comprises a guiding and clamping unit provided for guiding and clamping the second border after having crossed the slot shaping means.

4. The device as claimed in claim 1, characterized in that the welding member comprises a welding head mounted on an arm which can be displaced from and towards the second border, the arm being connected with a control unit provided for generating a series of pulses during the welding, the arm being provided for displacing the welding head from and towards the second border under control of the series of pulses.

5. The device as claimed in claim 4, characterized in that the arm is adjusted in such a manner as to leave a gap between an extremity of the welding head and the second border during the welding.

6. The device as claimed in claim 5, characterized in that the gap is smaller than 0.5 mm.

7. The device as claimed in claim 1, characterized in that the transport means comprises a pulling arm provided for pulling the second border and bringing the foil material towards the welding member.

8. The device as claimed in claim 7, characterized in that the foam dispensing station comprises second retaining means provided to operate synchronously with the transport means, the retaining means being further provided for retaining the foil material when the pulling arm applies a pulling force on the foil material.

9. The device as claimed in claim 8, characterized in that the second retaining means comprises at least two bars extending substantially perpendicular with respect to the first retaining means, the bars being movable mounted in such a manner as to move towards and from the foil material.

10. The device as claimed in claim 1, characterized in that the dispensing member is provided to be displaced between a first position situated within the inner space and a second position situated at a head cleaning station.

11. The device as claimed in claim 10, characterized in that the head cleaning station comprises a reservoir provided for storing a cleaning fluid, the reservoir being provided with a cover head having a displaceable opening lid.

12. The device as claimed in claim 11, characterized in that the opening lid is provided to be opened when the dispensing member reaches the second position and to be closed when the dispensing member leaves the second position.

13. The device as claimed in claim 1, characterized in that the foam dispensing member is provided to be moved into the inner space over a distance extending between the second border and an upper side of the slot shaping means.

14. The device as claimed in claim 1, characterized in that the first and second side wall of the foil material form a closed loop, the device being provided with a cutting member mounted upstream of the foam dispensing station and provided for applying the opening at the second border.

15. The device as claimed in claim 14, characterized in that the cutting member comprises a pen provided for penetrating into the inner space and for supporting the second border.

16. The device as claimed in claim 1, characterized in that the first and second border are opposite to each other when the foil material crosses the foil supply station and the foam dispensing station.

17. The device as claimed in claim 1, characterized in that the foil material is provided with a series of bars printed each time at equal distance from each other, the device comprises bar reading means provided for reading the bars of the series and determining a speed signal indicating a speed at which the foil material travels through the device.

18. The device as claimed in claim 1, characterized in that the foil supply station comprises chicane shaping means provided to impose a chicane path on the foil material.

* * * * *